US012352296B2

(12) United States Patent
Acome et al.

(10) Patent No.: US 12,352,296 B2
(45) Date of Patent: Jul. 8, 2025

(54) WEARABLE HYDRAULICALLY AMPLIFIED SELF-HEALING ELECTROSTATIC ACTUATOR SYSTEMS

(71) Applicant: Artimus Robotics Inc., Boulder, CO (US)

(72) Inventors: Eric Lucas Acome, Longmont, CO (US); Nicholas Alexander Kellaris, Boulder, CO (US); Shane Karl Mitchell, Boulder, CO (US); Timothy G. Morrissey, Boulder, CO (US)

(73) Assignee: Artimus Robotics Inc., Boulder, CO (US)

( * ) Notice: Subject to any disclaimer, the term of this patent is extended or adjusted under 35 U.S.C. 154(b) by 0 days.

(21) Appl. No.: 18/138,445

(22) Filed: Apr. 24, 2023

(65) Prior Publication Data

US 2023/0340970 A1 Oct. 26, 2023

Related U.S. Application Data

(60) Provisional application No. 63/333,846, filed on Apr. 22, 2022.

(51) Int. Cl.
*F15B 15/08* (2006.01)
*H02N 1/00* (2006.01)

(52) U.S. Cl.
CPC ........... *F15B 15/088* (2013.01); *H02N 1/006* (2013.01)

(58) Field of Classification Search
CPC .............................. F15B 15/103; F15B 15/088
See application file for complete search history.

(56) References Cited

U.S. PATENT DOCUMENTS 10,995,779 B2  5/2021 Keplinger et al.
11,353,009 B1* 6/2022 Rowe ..................... F15B 21/06
(Continued)

FOREIGN PATENT DOCUMENTS

EP  3601810 A1  2/2020
EP  3762618 A1  1/2021
(Continued)

OTHER PUBLICATIONS

Green, Robert, When is a multichannel power supply more convenient than a single-channel power supply?, May 18, 2013, Electronic Design News; Internet: <URL:https://www.edn.com/when-is-a-multichannel-power-supply-more-convenient-than-a-single-channel-power-supply.html>.*
(Continued)

*Primary Examiner* — Kenneth Bomberg
*Assistant Examiner* — Daniel S Collins
(74) *Attorney, Agent, or Firm* — NOD Law PC

(57) ABSTRACT

Wearable actuator systems are disclosed herein. The wearable actuator system may include an active layer comprising a plurality of actuators, each actuator having a deformable shell that defines an enclosed internal cavity, a fluid dielectric contained within the enclosed internal cavity, a first electrode disposed over a first side of the enclosed internal cavity, and a second electrode disposed over a second side of the enclosed internal cavity. The system further includes an interface layer and a fastener, wherein the active layer and the fastener form an enclosed shape having an internal area, and wherein a size of the internal area of the enclosed shape is adjustable using the fastener.

20 Claims, 13 Drawing Sheets

(56) References Cited

U.S. PATENT DOCUMENTS

| | | | |
|---|---|---|---|
| 11,408,452 B2 | 8/2022 | Keplinger et al. | |
| 11,486,421 B2 | 11/2022 | Keplinger et al. | |
| 11,635,094 B2 | 4/2023 | Keplinger et al. | |
| 11,795,979 B2 | 10/2023 | Keplinger et al. | |
| 11,827,459 B2 | 11/2023 | Morrissey et al. | |
| 2020/0032822 A1 | 1/2020 | Keplinger et al. | |
| 2021/0172460 A1 | 6/2021 | Keplinger et al. | |
| 2021/0369547 A1 | 12/2021 | Mau et al. | |
| 2022/0088774 A1 | 3/2022 | Kim et al. | |
| 2022/0158570 A1 | 5/2022 | Keplinger et al. | |
| 2022/0232903 A1* | 7/2022 | Rutledge | A41B 13/06 |
| 2022/0316466 A1 | 10/2022 | Mitchell et al. | |
| 2022/0321033 A1* | 10/2022 | Rowe | B25J 9/12 |
| 2023/0091400 A1 | 3/2023 | Acome et al. | |
| 2023/0200250 A1 | 6/2023 | Correll et al. | |
| 2023/0258203 A1 | 8/2023 | Keplinger et al. | |
| 2023/0278477 A1 | 9/2023 | Acome et al. | |
| 2023/0340970 A1 | 10/2023 | Acome et al. | |

FOREIGN PATENT DOCUMENTS

| | | |
|---|---|---|
| WO | 2018175741 A1 | 9/2018 |
| WO | 2019173227 A1 | 9/2019 |
| WO | 2020180982 A1 | 9/2020 |
| WO | 2020180986 A1 | 9/2020 |
| WO | 2021030742 A1 | 2/2021 |
| WO | 2022050997 A2 | 3/2022 |
| WO | 2023158568 A1 | 8/2023 |

OTHER PUBLICATIONS

Acome, Eric et al., Hydraulically amplified self-healing electrostatic actuators with muscle-like performance, Science 359, pp. 61-65, (2018), Publ. in: US.

Kellaris, Nicholas et al., "An analytical model for the design of Peano-HASEL actuators with drastically improved performance", Extreme Mechanics Letters, 29, (2019), 100449, published by Elsevier Ltd., 10 pages, Publ. in: US.

Kellaris, Nicholas et al., Peano-HASEL actuators: Muscle-mimetic, electrohydraulic transducers that linearly contract on activation, Sci. Robot. 3, eaar 3276, (2018), 11 pages, Publ. in: US.

Mitchell, et al.; An Easy-to-Implement Toolkit to Create Versatile and High-Performance HASEL Actuators for Untethered Soft Robots; Adv. Sci.; 2019, 6, 1900178, 15 pages, Publ. in: US.

Non-Final Office Action for U.S. Appl. No. 18/237,388, mailed May 30, 2024, 26 pages, Publ. in: US.

Rothemund, et al.; Dynamics of electrohydraulic soft actuators; PNAS; vol. 117; No. 28; Jul. 14, 2020; pp. 16207-16213, Publ. in: US.

Wang et al.; High strain Peano-HASEL actuators; doi:10.1002/adfm. 201908821; Dec. 15, 2019, 24 pages, Publ. in: US.

Wang, Xingrui et al., "High-Strain Peano-HASEL Actuators", Adv. Funct. Mater., 2020, 30, 1908821, 9 pages, Publ. in: US.

* cited by examiner

WEARABLE HYDRAULICALLY AMPLIFIED SELF-HEALING ELECTROSTATIC ACTUATOR SYSTEMS

REFERENCE TO RELATED APPLICATIONS

The present application claims the benefit of U.S. Provisional Pat. App. No. 63/333,846, filed 2022 Apr. 22 and titled "Wearable Hydraulically Amplified Self-Healing Electrostatic Actuator Systems," which is incorporated hereby in its entirety by reference.

FIELD OF THE INVENTION

The present invention relates to actuator systems. In particular, but not by way of limitation, the present invention relates to wearable actuator systems suitable for use for a variety of applications.

SUMMARY OF THE INVENTION

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In an aspect, wearable actuator systems are disclosed herein. An wearable actuator system may include an active layer including a plurality of actuators, each actuator having a deformable shell that defines an enclosed internal cavity, a fluid dielectric contained within the enclosed internal cavity, a first electrode disposed over a first side of the enclosed internal cavity, and a second electrode disposed over a second side of the enclosed internal cavity. The system further may include an interface layer and a fastener, wherein the active layer and the fastener form an enclosed shape having an internal area, and wherein a size of the internal area of the enclosed shape is adjustable using the fastener.

In embodiments, the active layer is inelastic. In certain embodiments, the fastener includes at least one of a strap, an elastic section, hook and loop, and a buckle. The interface layer may be formed of a nylon material. The wearable actuator system may also include an outer layer disposed on a second side of the active layer opposite the first side, wherein the outer layer is formed of a flexible material or a rigid material.

In certain embodiments, the wearable actuator system includes a control module operably coupled with the active layer and configured to provide a control signal to at least a portion of the plurality of actuators in the active layer. In embodiments, the control signal includes at least one of a low-frequency signal and a high-frequency signal.

In embodiments, the plurality of actuators includes first and second subsets of actuators, and the control module is configured to provide a first control signal to the first subset and a second control signal to the second subset of actuators. In an alternative embodiment, the first subset is disposed in an inner sub-layer within of the active layer, and the second subset is disposed in an outer sub-layer within the active layer. In certain aspects, the first subset is configured to actuate along a first zipping front directed in a first direction and wherein the second subset is configured to actuate along a second zipping front in a second direction different from the first direction. In embodiments, the first signal is operable to actuate the first subset of the plurality of actuators at a first time and wherein the second signal is operable to actuate the second subset of the plurality of actuators at a second time different from the first time. The first signal and the second signal may have different signal characteristics, including at least one of voltage, frequency, current, and duty cycle.

In another embodiment, the wearable actuator system further includes a power source electrically coupled with the control module and the active layer. The power source may include a multi-channel power supply.

In still another embodiment, the control module is configured to receive a feedback signal from at least one of the plurality of actuators. In certain embodiments, the control module is configured to calculate an actual applied pressure based on the feedback signal. The control module may be further configured to adjust the control signal based on the calculated actual applied pressure.

In certain embodiments, the actuators may be physically coupled in at least one of a stack and a chain. In embodiments, the actuators are electrically coupled in parallel.

In another aspect, a method of operating a wearable actuator system is disclosed. The method includes providing a plurality of actuators disposed within an active layer of a wearable actuator system, providing a control module operatively coupled with the plurality of actuators, generating a control signal using the control module and providing the control signal to at least one actuator of the plurality of actuators. The method further includes actuating the at least one actuator in response to the control signal, receiving at the control module a feedback signal from the at least one actuator, calculating an applied pressure based on the feedback signal, generating a modified control signal based on the calculated applied pressure; and providing the modified control signal to at least one actuator of the plurality of actuators.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

The appended drawings illustrate only some implementation and are therefore not to be considered limiting of scope.

Figure 1:
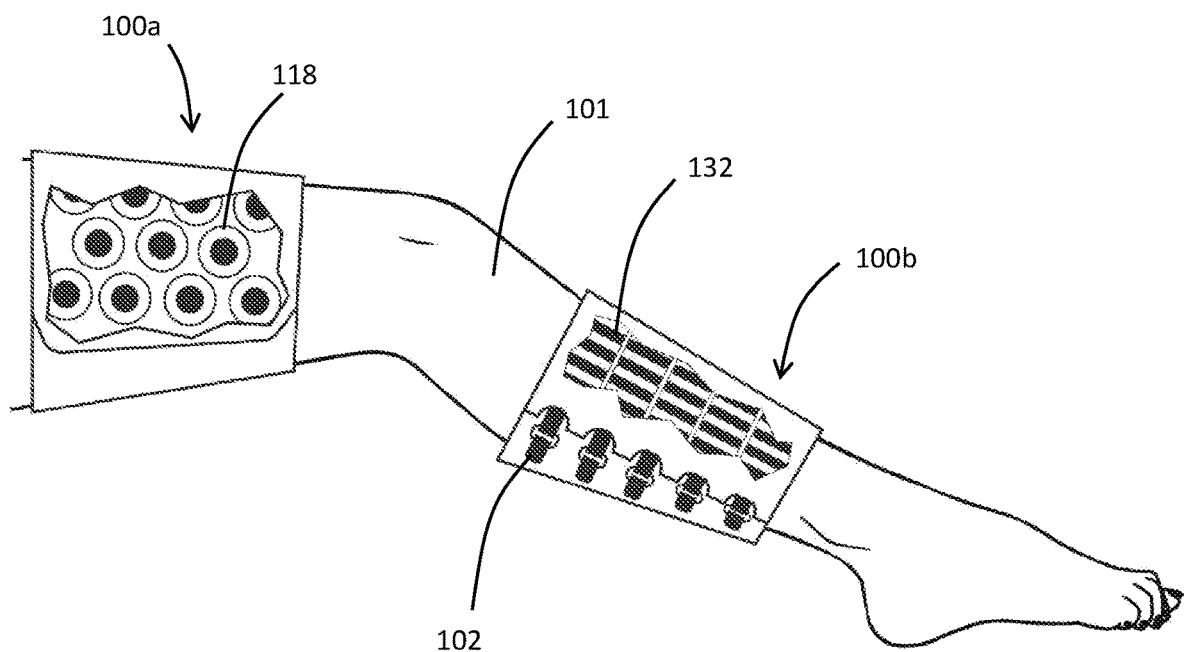
FIG. 1 is a cut-away side view of wearable actuator systems as worn by a user, in accordance with an embodiment.

For simplicity and clarity of illustration, the drawing figures illustrate the general manner of construction, and descriptions and details of well-known features and techniques may be omitted to avoid unnecessarily obscuring the embodiments detailed herein. Additionally, elements in the drawing figures are not necessarily drawn to scale. For example, the dimensions of some of the elements in the figures may be exaggerated relative to other elements to help improve understanding of the described embodiments. The same reference numerals in different figures denote the same elements.

The word "exemplary" is used herein to mean "serving as an example, instance, or illustration." Any embodiment described herein as "exemplary" is not necessarily to be construed as preferred or advantageous over other embodiments. In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents.

DETAILED DESCRIPTION OF THE INVENTION

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers, and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer, or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "compromising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Soft, electrostatic actuators may be used in wearable actuator systems to achieve significant improvements in medical, user input ("UI"), and other human-machine interaction applications. Using electrostatic actuators in wearable systems may reduce size, weight, noise, and set-up time while increasing portability and ease of use. Wearable hydraulic actuator systems may be used in many different therapeutic applications such in stimulating blood flow (e.g., for lymphedema, deep vein thrombosis, scar massage), reducing recovery time (e.g., muscle massage, scar tissue massage), providing compression treatment (e.g., for cystic fibrosis), or for diagnosing or monitoring medical conditions (e.g., blood pressure). Wearable actuator systems may also be used as user interface devices to receive input from a user or to provide feedback to a user.

Referring to FIG. 1, wearable actuator systems 100a and 100b are illustrated on the upper and lower leg sections, respectively, of a user 101. Systems 100a and 100b may include compression and/or massage systems configured to apply pressure to a user's body with the goal of improving circulation, reducing circulation, loosening tight muscles, stabilizing or immobilizing a particular section of the anatomy, or achieving other rehabilitation or therapeutic effects.

Figure 2A:
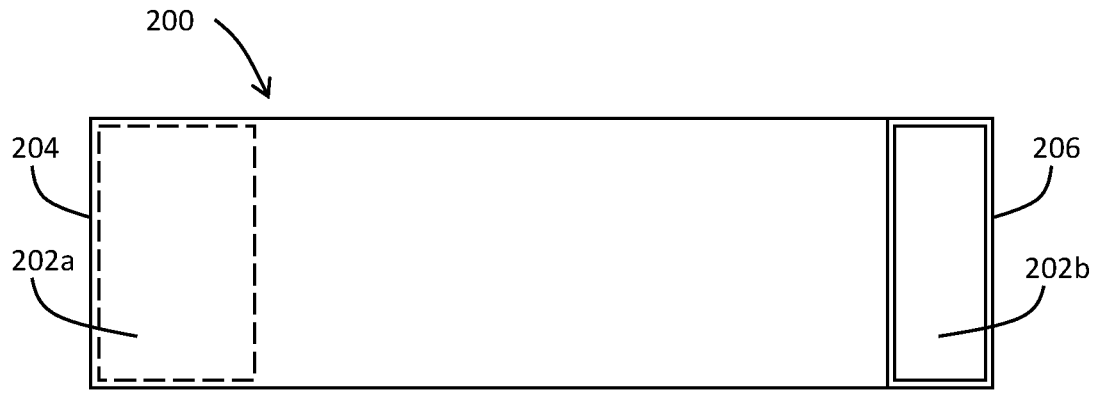
FIGS. 2A-2B show a front view and a back view, respectively, of an unfastened wearable actuator system, in accordance with an embodiment.
Figure 2B:
Figure 2C:
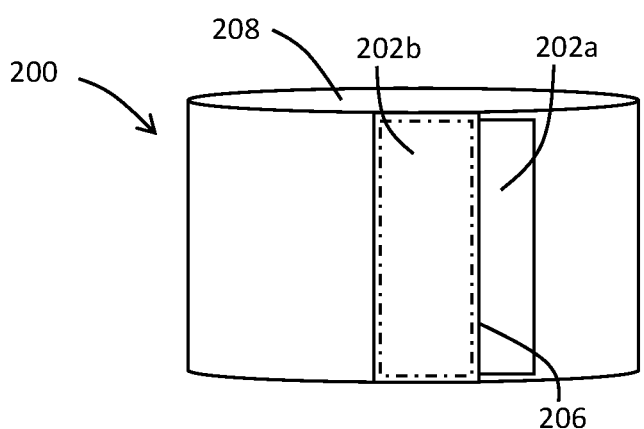
FIG. 2C shows a perspective view of a fastened wearable actuator system, in accordance with an embodiment.

In general, the actuator systems disclosed herein, including systems 100a and 100b, enclose an internal area which is configured to receive a portion of the user's body (e.g., a thigh or calf as illustrated in FIG. 1). In some embodiments, the internal area is formed by securing one or more fasteners 102 between two ends of the actuator system so as to form an enclosed space around the user's body. This configuration is demonstrated in further detail in FIG. 2. FIGS. 2A and 2B illustrate front and back views, respectively, of a wearable actuator system 200 in a flat, unfastened position. Wearable actuator system 200 includes a first end 204 and a second end 206 that is opposite the first end. First end 204 includes a first portion of a fastener 202a and second end 206 includes a second portion of a fastener 202b. The first and second portions of the fastener are configured to removably couple so as to hold first and second ends 204, 206 together as illustrated in FIG. 2C. FIG. 2C shows a perspective view of wearable actuator system 200 in fastened position wherein first and second ends 204, 206 are engaged via portions of fastener 202a, 202b. In the fastened position, the actuator system 200 forms a perimeter around an enclosed space 208. Enclosed space 208 has an initial cross-sectional area as wearable actuator system 200 is fastened. The size and shape of the initial cross-sectional area may depend on how tightly the fastener is engaged and may further depend on the object (e.g., portion of a user's body) around which the wearable actuator is wrapped. In some embodiments, portions of the wearable actuator system are flexible to accommodate different shapes (e.g., anatomical shapes). In some embodiments, flexible portions of the wearable actuator system are inelastic so as to avoid stretching under normal use.

Figure 3:
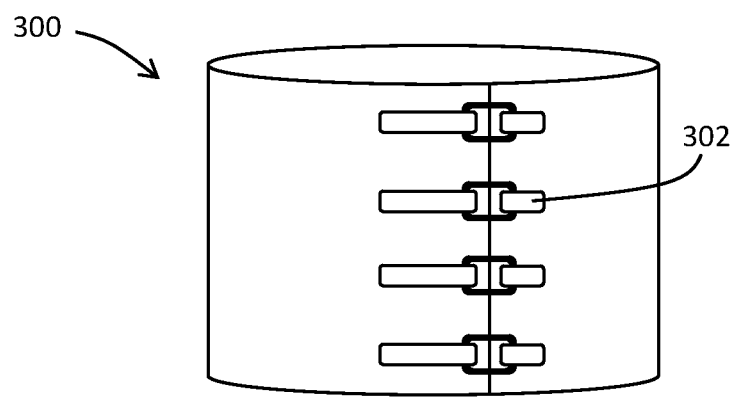
FIG. 3 shows a perspective view of a fastened wearable actuator system having mechanical fasteners, in accordance with an embodiment.
Figure 4:
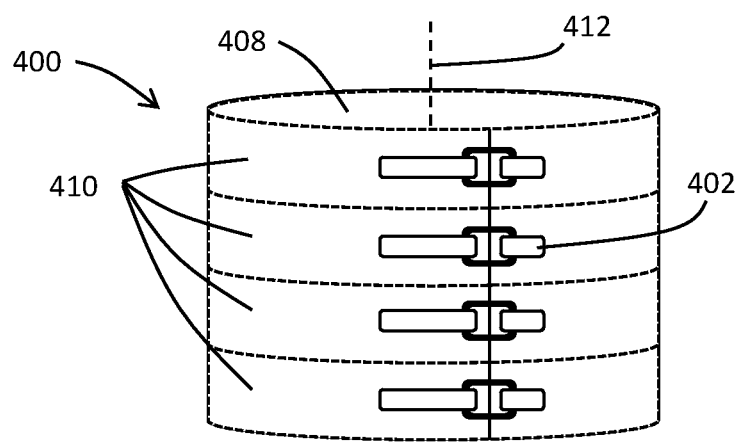
FIG. 4 shows a perspective view of a fastened wearable actuator system having subsections therein, in accordance with an embodiment.

First and second portions of fasteners 202a, 202b illustrated may include selectively removable mechanical fastening mechanisms such as hook and loop. Referring to FIG. 3, a wearable actuator system 300 includes other types of fasteners 302, such as a plurality of buckles. The buckles may be used instead of or in addition to other fasteners, such as snaps, belts, knots, or other selectively removable fastening mechanisms. FIG. 4 illustrates a wearable actuator system 400 that is similar to the system 300 and includes a plurality of fasteners 402. In system 400, however, each fastener 402 may be used to independently adjust cross-sectional areas of one or more specific regions 410 of enclosed area 408 along a longitudinal axis 412. In some embodiments, each region 410 of system 400 is associated with a distinct group of actuators (not shown). Specific components that may be included in wearable actuator systems will be described in further detail herein below.

Figure 5:
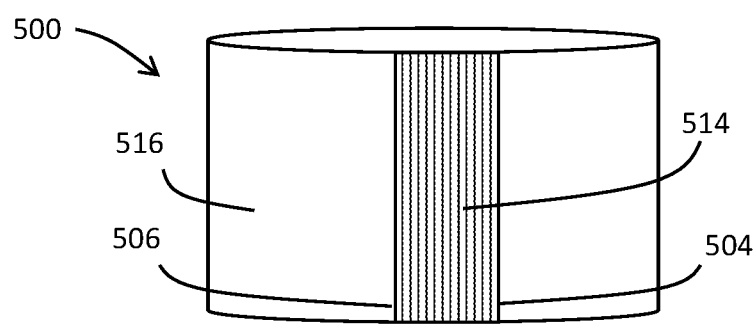
FIG. 5 shows a wearable actuator system having an elastic portion, in accordance with an embodiment.

FIG. 5 illustrates a different approach to facilitate donning and/or doffing the wearable actuator system 500. System 500 includes an elastic section 514 connecting a first end 504 and a second end 506 of an active portion 516 of wearable actuator system 500. In such a configuration, the elasticity of elastic section 514 allows a user to pull system 500 over larger cross-section anatomy (e.g., a foot, ankle, hand, etc.) to reach smaller cross-section anatomy (e.g., calf, wrist, etc.). Active portion 516 of system 500 may be defined as the portion of system 500 containing actuators therein. Active portion 516 may be flexible and inelastic. In some embodiments, system 500 may include fasteners in addition to the elastic section to further adjust certain regions of the system.

Figure 6A:
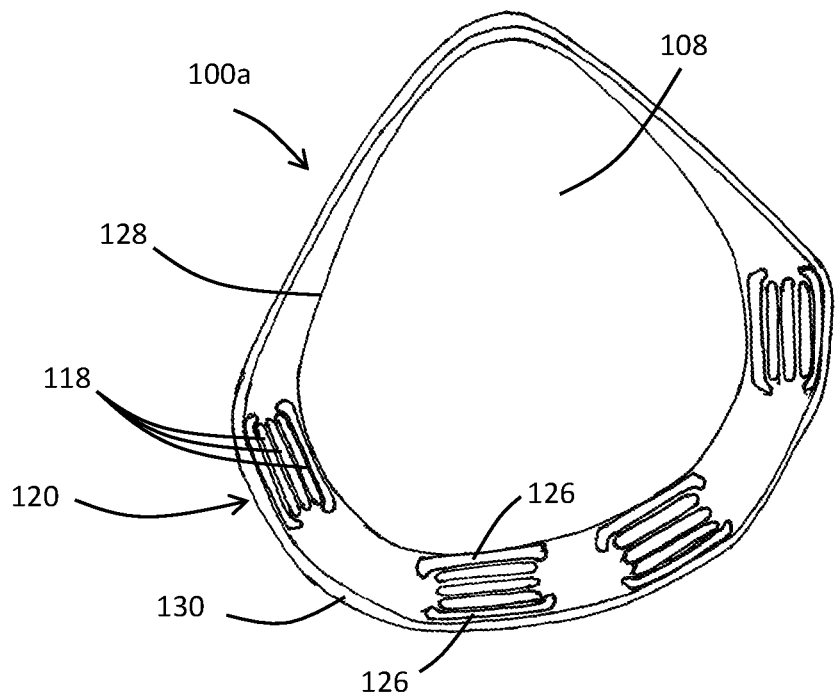
FIGS. 6A and 6B illustrate top views of a wearable actuator system in an off-state and in an on-state, respectively, in accordance with an embodiment.
Figure 6B:
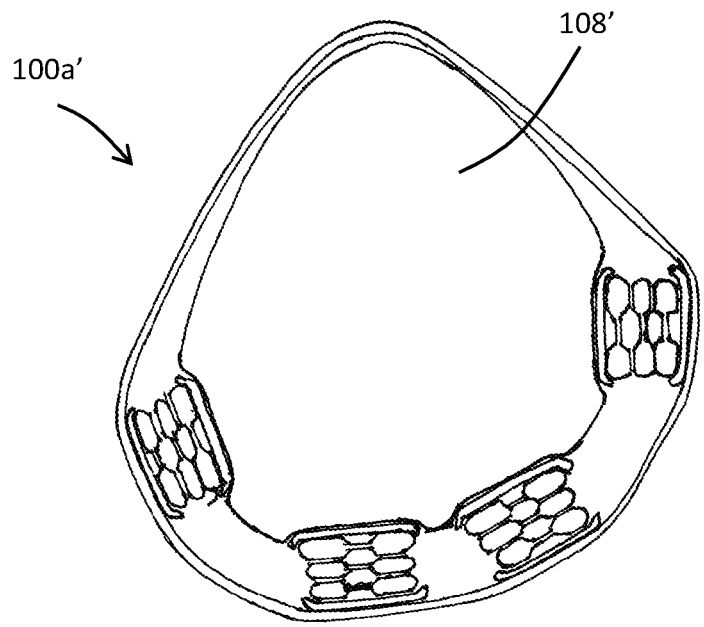

Referring back to FIG. 1, systems 100a and 100b may both include a plurality of actuators disposed therein. A cutout view of system 100a shows an array of expanding actuators 118. FIGS. 6A and 6B illustrate top-down views of system 100a in an off-state and in an on-state, respectively. In some embodiments, the expanding actuators 118 may be grouped into a plurality of stacks 120 containing two or more actuators each. While on-state system 100a' in FIG. 6B shows all of actuators 118 in an expanded on-state, not all actuators 118 are required to be actuated simultaneously. The particular actuation scheme may be selected as a matter of design choice or may be adjusted automatically or based on input from a user.

Figure 7A:
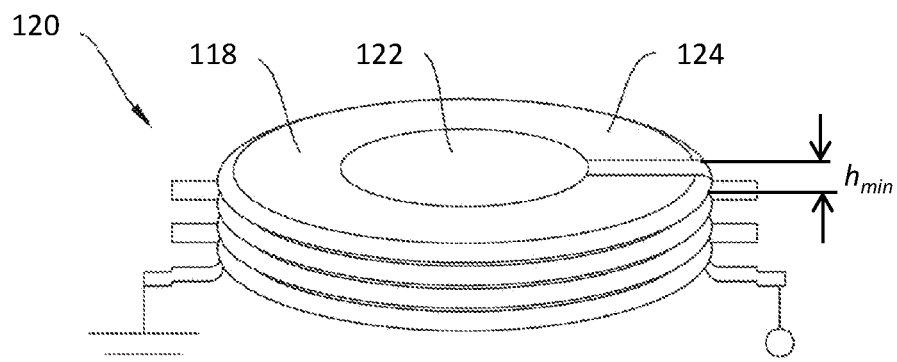
FIGS. 7A and 7B illustrate perspective views of an actuator stack in an off-state and in an on-state, respectively, in accordance with an embodiment.
Figure 7B:
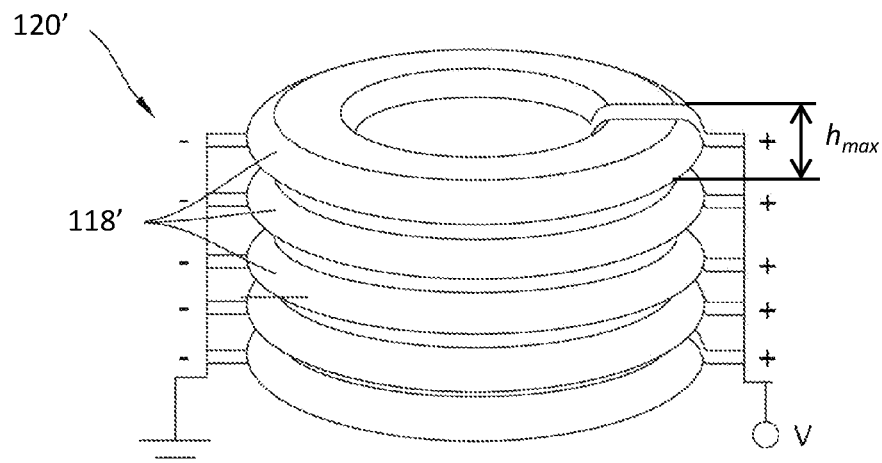
Figure 7C:
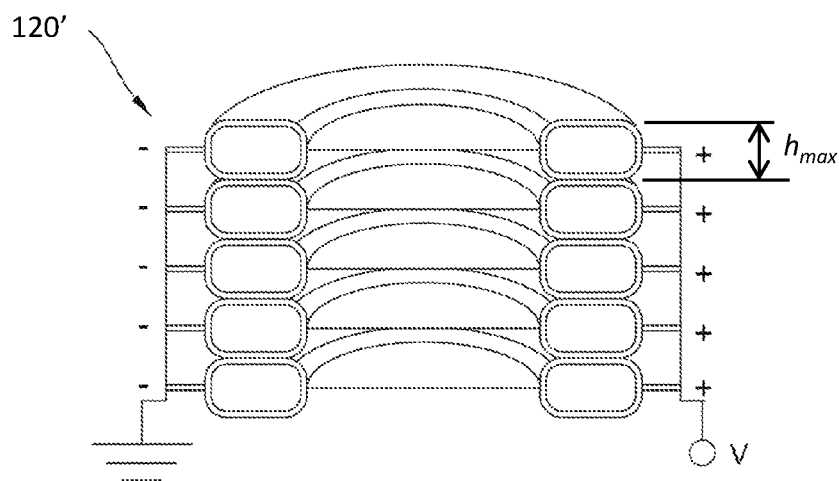
FIG. 7C illustrates a cross-sectional view of an actuator stack in an on-state, in accordance with an embodiment.

Stacks 120 of expandable actuators 118 are shown in further detail in FIGS. 7A-7C. FIG. 7A illustrates a stack 120 of expandable actuators 118 in an off-state (i.e., not receiving voltage from a power source). Stack 120 has an off-state height (i.e., a minimum height), $h_{min}$. Each actuator 118 includes at least one flexible, inelastic pouch filled with dielectric fluid. The dielectric pouch may be formed from a dielectric material. In some embodiments, each pouch includes one or more layers of dielectric film. A first electrode 122 is disposed on a top surface 124 of the actuator pouch and a second electrode (not visible) is disposed on a bottom surface of the actuator pouch opposite the first electrode. An outer dielectric film (not shown) may be used to cover the first and/or second electrodes to provide protection and/or electrical insulation. The first and second electrodes may be positioned within a central portion of the top and bottom surfaces of the pouch. At least one of the first and second electrode is configured to receive a voltage from a power source (not shown). In response to receiving the voltage, the first and second electrodes of each actuator 118 draw together, thereby displacing the dielectric fluid within the pouch to an outer periphery of the actuator and causing the overall height of the actuator to increase to an on-state maximum height, $h_{max}$. Actuated stack 120' of expanded actuators 118' is illustrated in FIGS. 7B and 7C. FIG. 7C illustrates a cross-section of the donut-shaped expanded actuators with dielectric fluid pushed to the outer periphery of each actuator pouch. By placing electrodes in the center of the pouch and pushing fluid to the periphery of the pouch, actuated stack 120' achieves a stable actuated state. In some embodiments, electrodes may be placed around a periphery of the pouch and dielectric fluid may be displaced to a center portion of the pouch during actuation; however, such a configuration may be less stable and the individual actuators within the stack may be more likely to laterally displace relative to each other. Additional details about the stacks of electrodes may be found in the international publication titled "Hydraulically Amplified Self-Healing Electrostatic Transducers" filed Mar. 22, 2018 and published as international publication number WO2018/175741, the entirety of which is incorporated herein by reference.

While electrodes 122 are illustrated as being circular and solid (i.e., without spaces within the perimeter of the electrode), other electrode shapes are possible. For example, the electrodes may have an open center (e.g., a ring-shaped electrode) or a plurality of openings within the outer peripheral shape. Additionally, an outer periphery of the electrode may be circular, non-linear, notched, or irregularly shaped. While each actuator pouch is illustrated as having a circular shape, other shapes are possible, such as square, rectangular, trapezoidal, other regular or irregular shapes, or polygonal shapes with sharp or rounded corners. The pouch may be formed from a flexible, inelastic material such as thin film polymers. The thin film polymers may be materials such as polyimide, biaxially-oriented polypropylene ("BOPP"), and/or polyethylene terephthalate ("PET"). High performance capacitor polymers may also be used, such as polyvinylidene fluoride ("PVDF"), PVDF copolymer, PVDF terpolymer, polyvinyl chloride ("PVC"), polyethylene naphthalate ("PEN"), and/or polycarbonate ("PC"). In some embodiments, the dimensions of the actuator may be such that the actuator fits within a 100 mm×100 mm×50 mm volume. The dielectric fluid within each pouch may include silicone oil, natural ester oils, and/or mineral oils.

Referring back to FIGS. 6A and 6B, stacks 120 of expanding actuators may further include end caps 126 over ends of the actuator stack. The end caps may improve transmission of force between the actuators and the object (e.g., the user). Stacks 120 may be located within an active layer of wearable actuator system 100a. The active layer may be located between an interface layer 128 and an outer layer 130. Interface layer 128 is located nearest enclosed space 108 and is configured to contact the object around which the wearable actuator is positioned (e.g., a user). In some embodiments, the interface layer is formed from a low-friction material, such as nylon fabric, that facilitates smooth movement of the actuators between on- and off-states. Outer layer 130 is disposed furthest from enclosed space 108 and is on a side of the active layer that is opposite the interface layer. The outer layer may be formed from a flexible, inelastic material, an elastic material, or a rigid material. In some embodiments, it may be advantageous for the outer layer to include an inelastic and/or rigid material or rigid portions against which the on-state actuators can push to apply a force to the object (e.g., the user) positioned within enclosed space 108. When in the on-state, a cross-section of the internal area of enclosed space 108' may be smaller than the internal area of enclosed space 108 when the system is in an off-state. Correspondingly, when the wearable actuator moves from an off-state to an on-state, a volume of space enclosed by the wearable actuator system decreases.

Stacks 120 of actuators within the active layer may be regularly or irregularly spaced apart as shown or may be in direct contact with each other such that there are substantially no gaps between the stacks when the actuators are in the off-state. Additionally, the actuators may be aligned in columns and rows. Alternatively, stacks 120 may be staggered or otherwise offset as illustrated in FIG. 1. In some embodiments, the location of actuator stacks may be chosen so as to specifically align with particular anatomical features to achieve specific therapeutic benefits. For example, in wearable actuator systems intended to be used for massage or compression, the actuators may be positioned in areas corresponding to anatomical areas with musculature and may be omitted from anatomical areas corresponding to bones, sensitive nerve structures or vasculature structures. Other targeted actuator locations may be selected as a matter of design choice without departing from the scope of the present disclosure.

Figure 8A:
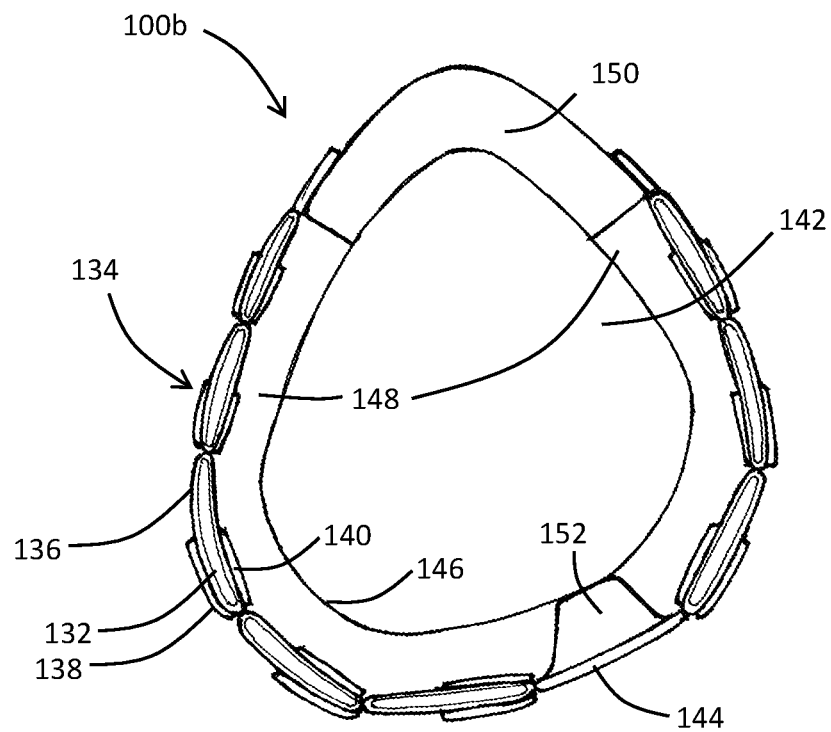
FIGS. 8A and 8B illustrate top views of a wearable actuator system in an off-state and in an on-state, respectively, in accordance with an embodiment.
Figure 8B:
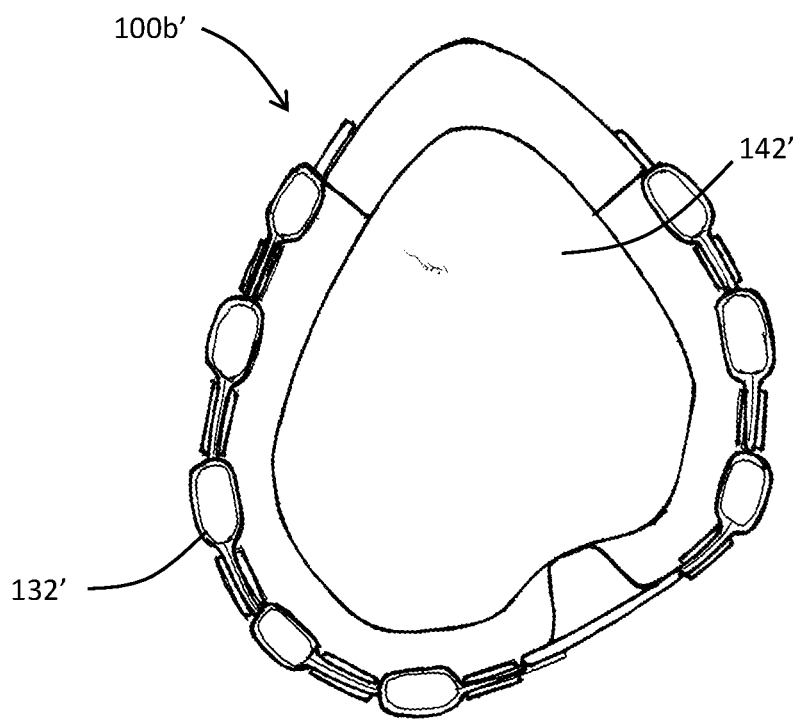

Referring back to FIG. 1, wearable actuator system 100b includes a plurality of contracting actuators 132 as seen through a cutout view of the system. Contracting actuators 132 have a different configuration than the expanding actuators described above. Actuator system 100b is described in further detail with respect to FIGS. 8A and 8B which show top-down views of the system in an off-state and in an on-state, respectively. System 100b includes an active layer having a plurality of actuators 132 physically coupled in series to form a chain 134 of actuators. The plurality of actuators may be electrically coupled in parallel, in series, or may be individually actuated with a unique power supply. Each actuator includes a flexible, inelastic pouch 136 formed from a dielectric material and defining an internal cavity that is filled with a dielectric fluid. A first electrode 138 is on a first side of the pouch and a second electrode 140 is on a second side of the pouch opposite the first side. Similar to the expanding actuators described above with respect to system 100a, at least one of electrodes 138, 140 of contracting actuators 132 is configured to receive a voltage from a power source. Upon receiving a voltage from the power source, at least the electrodes are drawn together, thereby displacing the dielectric fluid within the pouch. In the configuration shown, electrodes 138, 140 all push dielectric fluid to one side. This particular actuator configuration is discussed in further detail with respect to FIGS. 10A and 10B below.

While the configuration of FIGS. 8A-10B show an actuator that pushes fluid to one side, other arrangements and configurations of contracting actuators may be used that push dielectric fluid to two sides depending on the particular design and location of the electrode pair. When the actuators are actuated in the on-state as illustrated in FIG. 8B, the length (e.g., as measured around the circumference) of the chain of actuators decreases and a height (i.e., in the radial direction) of a portion of each actuator of the chain increases. When the chain is part of an enclosed shape that forms an internal area 142 in the off-state, the internal area 142' in the on-state is decreased when one or more actuators in the chain of actuators is actuated. The plurality of actuators may include a spacer region 144 between actuators 132 within chain 134. The spacer region may not include a pouch, electrodes, or other components of an actuator and may instead be configured to remain the same size whether the system is in an on-state or an off-state. Such spacers may be placed according to particular designs or functional goals and may be used to more selectively distribute pressure when the system is in an on-state.

System 100b further includes an interface layer 146 around which the plurality of contracting actuators is disposed. The interface layer may include regions made from different materials. For example, regions 148 disposed adjacent actuators 132 may be a rigid material. Regions 148 may be designed to contact areas of the user where muscles are located (e.g., over a lateral or medial posterior area of a calf muscle in the lower leg). Region 150 of interface layer 146 may be a flexible, compliant, inelastic material that is less stiff than the regions 148. Region 150 may be configured to contact areas of the user where bones are located (e.g., over an anterior tibial region of a user's lower leg). Region 150 may also serve as a mounting point for one or more chains of actuators. In some embodiments, the interface layer further includes a force concentrator 152. Force concentrator 152 may be formed from a material with higher stiffness or rigidity than regions 148. Force concentrator 152 does not deform and may be located adjacent the spacer region 144. When the system moves from an off-state to an on-state, actuators 132 contract and pull the force concentrator inwardly toward the user. The shape and location of the concentrator may be selected so as to apply high amounts of pressure in specific areas for therapeutic or other user interface/haptic feedback applications.

Figure 9A:
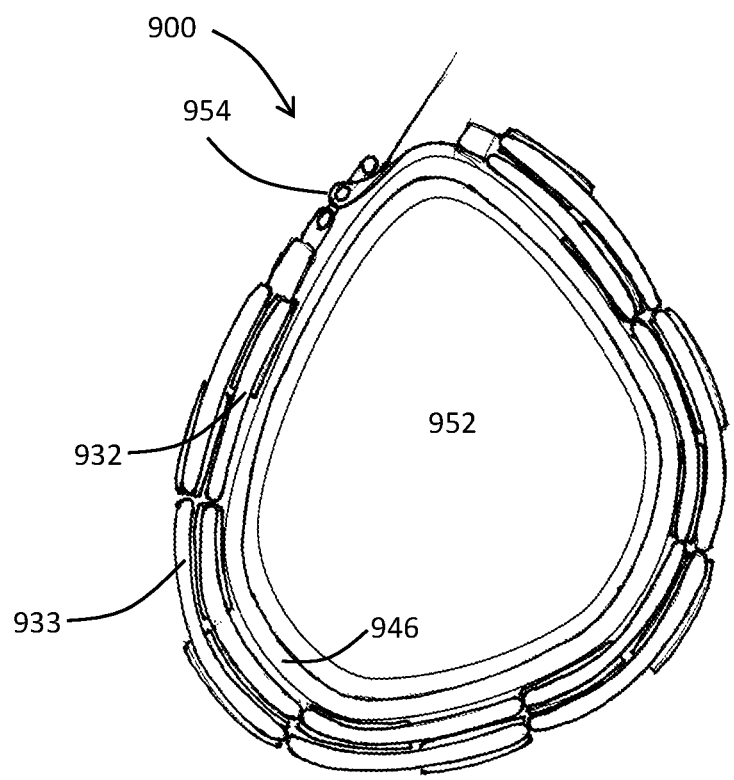
FIGS. 9A and 9B illustrate top views of a wearable actuator system in an off-state and in an on-state, respectively, in accordance with an embodiment.
Figure 9B:
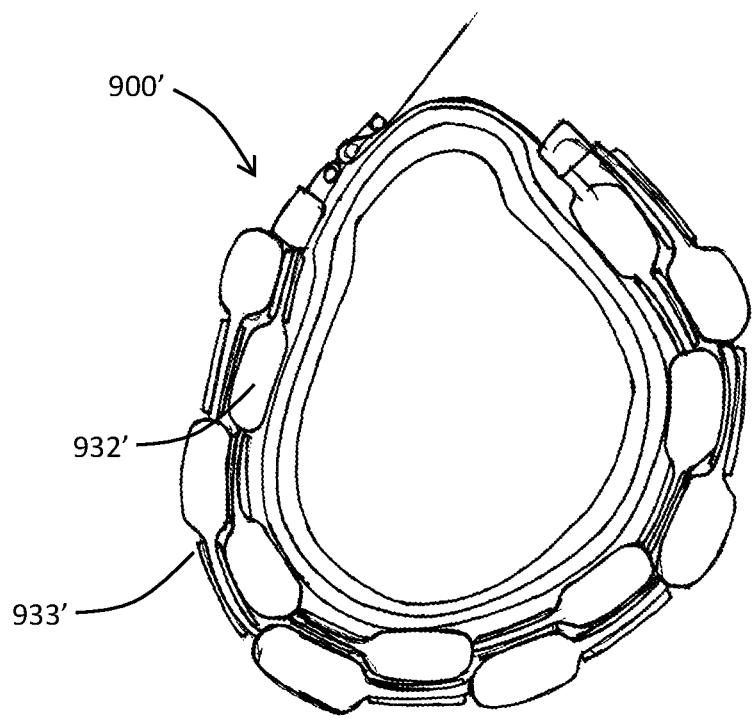

FIGS. 9A and 9B illustrate another embodiment of a wearable actuator system that uses contracting actuators. FIG. 9A illustrates a top-down view of a wearable actuator system 900 in an off-state. System 900 includes an interface layer configured to contact an object (e.g., the user's body 952) and an active layer disposed around the interface layer. The interface layer is formed from a flexible material that is able to deform as the actuators move between on- and off-states. The active layer includes a plurality of actuators that are connected together. While not illustrated, an outer layer may also be included around the active layer such that the active layer is between the interface and the outer layer. A fastener 954 is included in system 900 to assist with positioning and holding the wearable actuator system on a user.

In the embodiment shown, there are two sub-layers within the active layer. A first sub-layer includes a first group of actuators 932 disposed adjacent the interface layer and located closest to the user. A second sub-layer includes a second group of actuators 933 disposed adjacent the first sub-layer. The first and second sub-layers may be formed by folding a single chain of actuators in half and wrapping it around the interface layer. Alternatively, the first and second sub-layers may be separate groups of actuators. Actuators 932 and 933 include a flexible pouch with an inner cavity filled with dielectric fluid. As discussed with respect to actuators 132 in FIGS. 8A, 8B, each actuator includes a first electrode disposed on a first surface (e.g., a front surface) of the pouch and a second electrode disposed on a second surface (e.g., a back surface) of the pouch opposite the first surface. The two electrodes draw together when a voltage is applied, thereby displacing the dielectric fluid the portion of the pouch not covered by the first and second electrodes. As a result, the length of each electrode (e.g., in the circumferential direction) decreases when the wearable actuator system is actuated.

In the system 900, 900' shown in FIGS. 9A, 9B, respectively, actuators 932, 932' in the first sub-layer have electrodes placed on a first portion of the pouch (e.g., a left side of the pouch when the system is viewed from the top as shown) while actuators 933, 933' in the second sub-layer have electrodes placed on a second portion of the pouch (e.g., a right side of the pouch when the system is viewed from the top as shown). In such a configuration, the on-state actuators of the first and second sublayers are configured to nest such that electrode-covered regions of actuator pouches in the first sub-layer are offset relative to electrode-covered regions of actuator pouches in the second sub-layer. This nesting effect is illustrated in FIG. 9B when system 900' is in an on-state. Such a configuration may apply pressure more evenly to the user when compared with a system having a single layer of contracting actuators.

Figure 10A:
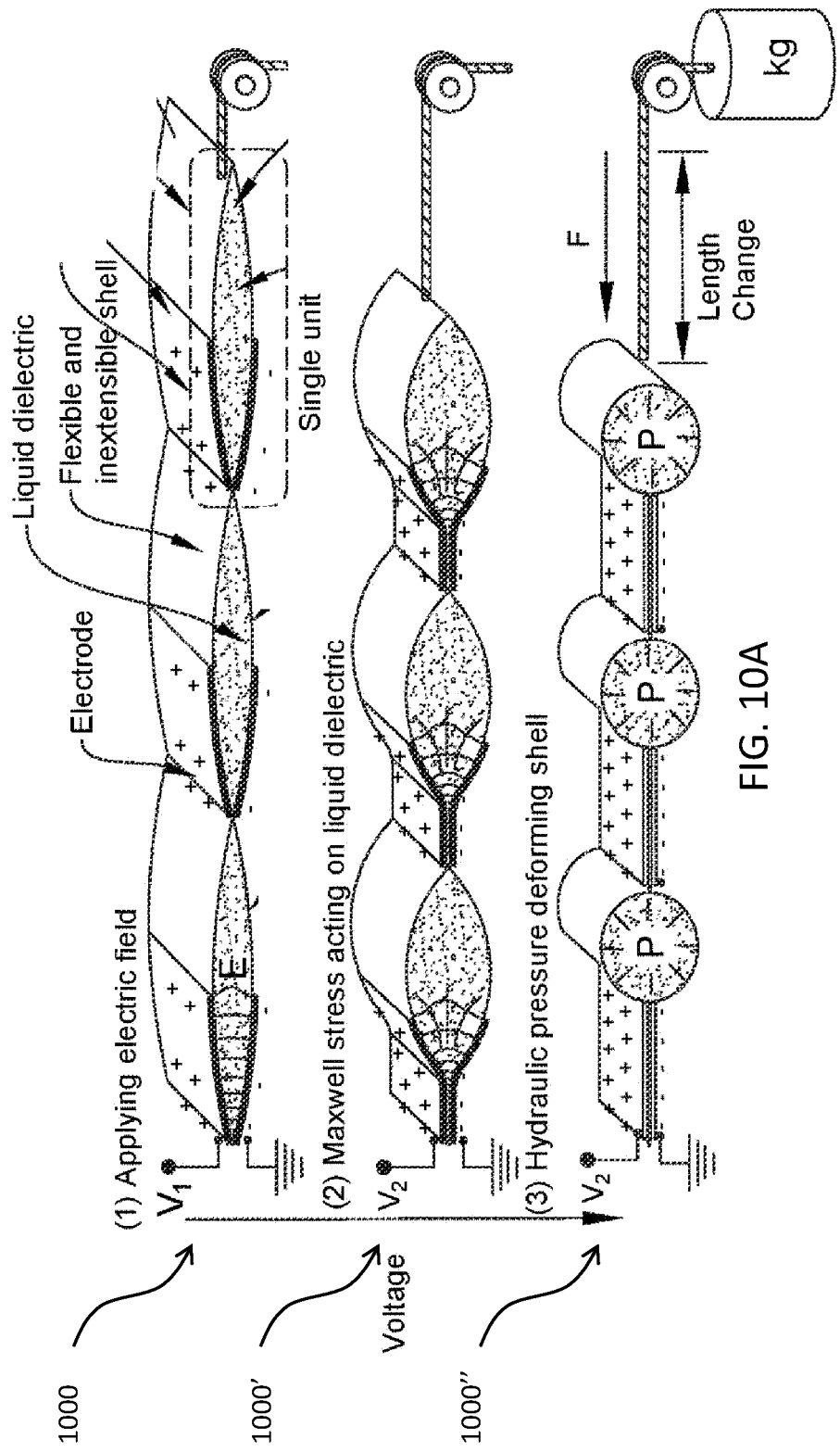
FIG. 10A illustrates a chain of contracting actuators in three phases of actuation, in accordance with an embodiment.

FIG. 10A shows a chain of three actuators in various phases of actuation. System 1000 shows the actuators in an off-state (i.e., in the top panel), system 1000' shows the actuators in an intermediate state (i.e., in the middle panel), and system 1000" shows the actuators in a fully on-state (i.e., in the bottom panel). In the off-state, the actuators (e.g., a first actuator disposed on a first side, such as a top side, of the actuator pouch) are shown in a resting position just prior to receiving a voltage from a power source. In the intermediate state, the electrodes have received and a voltage V2 higher than the first voltage V1 and as a result, the electrodes have begun to zip toward each other due to electrostatic forces between the electrode pairs. As the electrode pairs zip together, dielectric fluid is displaced toward one side of the pouch. The fluid displacement continues until the electrodes are drawn together (e.g., fully drawn together) such that a maximum amount of dielectric fluid is displaced to the side and the fully-on state is achieved.

Figure 10B:
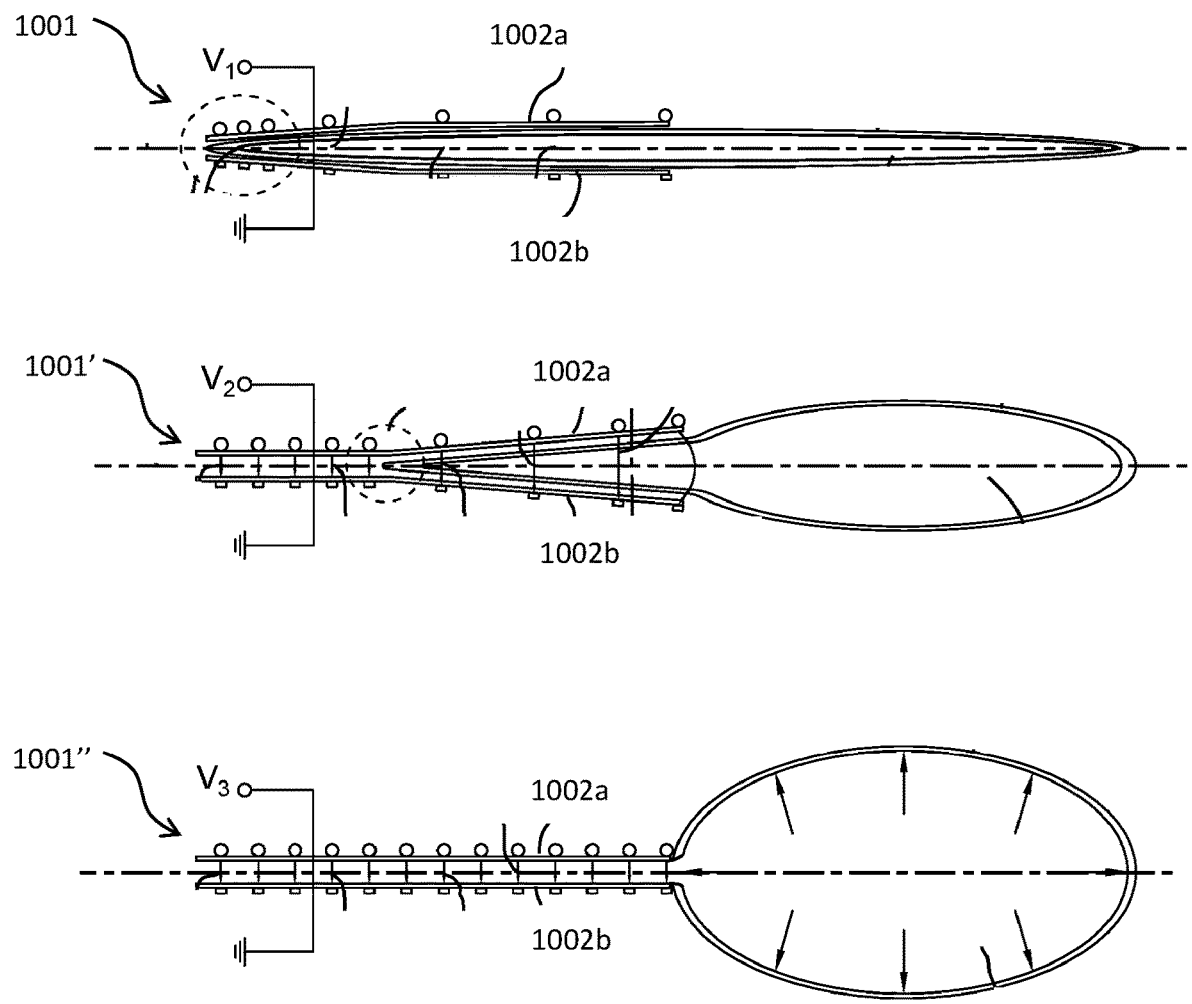
FIG. 10B illustrates a zipping actuator in three phases of actuation, in accordance with an embodiment.

FIG. 10B shows a zipping type actuator that may be used in one or more systems described herein. The individual zipping actuator is illustrated in various phases of actuation. Actuator 1001 is in an off-state (i.e., in the top panel), actuator 1001' is in an intermediate state (i.e., in the middle panel), and actuator 1001" is in a fully on-state (i.e., in the bottom panel). In the off-state, the actuator 1001 is at rest moments before or simultaneously with application of a voltage V1. In this state, the electric field generated by the relatively low voltage is concentrated at the edge of the tapered boundary where the electrodes 1002a, 1002b are closest together. This causes the tapered region to experience a high electrostatic stress in comparison to the rest of the shell, and in response, the electrodes 1002a, 1002b move closer together.

As shown in actuator 1001', as voltage is increased to V2, the electrostatic forces extend further, causing a larger portion of the electrodes 1002a, 1002b to be drawn together as the voltage overcomes the larger distances between the electrodes through the fluid dielectric. This urges the top and bottom layers of the shell to be urged together by the electrodes and forces the fluid (e.g., liquid) dielectric into an inactive area of the shell from the progressive zipping site which moves progressively to the right in the figure, through the active area as the voltage is increased further. It should be appreciated that in the case of a strain limiting layer, or when one side of the shell is otherwise fixed in position to another object (e.g., another actuator or a solid surface), that one side may remain stationary and relative movement between the top and bottom layers of the shell may be only with respect to the side which is not fixed. Notably, the length of the portion of electrodes 1002a, 1002b which are fully drawn together can be controlled along a continuum from zero to the full length of the electrodes based on how much voltage is supplied. This configuration provides a high degree of control over the extent to which the actuator is actuated as compared to binary or "on/off" actuators.

Upon full actuation caused by voltage V3, illustrated with respect to actuator 1001", substantially all of the fluid dielectric is forced into the inactive region of shell (e.g., the portion of the shell that is not covered by an electrode). In this state, electrodes 1002a, 1002b are fully drawn together, pinching the active portion of shell (e.g., the portion of the shell covered by electrodes). In this fully on-state, the distance between the electrodes 1002a, 1002b is substantially constant along the length of the electrodes. The zipping action described with respect to FIG. 10B may be applied to actuators having electrodes located at any position on the dielectric pouch. For example, zipping actuators may have electrodes in a center, periphery, or side of the pouch.

Wearable actuators disclosed herein may further include a control module operatively coupled with one or more of the actuators or actuator stacks. A power source is electrically coupled with the control module and the actuators to provide a voltage to one or more electrodes of one or more of the actuators. The power source may be a single- or multi-channel power supply to allow for variable frequency control. Signals provided to the actuators by the control module may include combined waveforms to provide, for example, low-frequency (or even direct current "DC") in addition to high-frequency vibrations. Other waveforms such as variable magnitude, high-bandwidth, fast on/slow off, or waveforms having other specific characteristics may be produced. In some embodiments, the power source is a high-voltage power supply ("HVPS") including a DC-DC converter and high-voltage switching. Low voltage input signals to the power supply may be amplified to high voltage that can be used for actuation of actuators within a wearable system. Systems may include one or more power supply. For example, there may be a single power supply for a plurality of actuators within the system, or alternatively, the system may include one power supply per actuator.

The control module may modulate voltage distribution to individual actuators, groups of actuators, or all actuators within the wearable actuator system simultaneously. The control module may instruct individual actuators or sub-sets of actuators to be actuated in a pattern, in a certain direction (e.g., starting at a bottom portion of the system and moving toward the top), at a certain intensity, or for a certain duration in order to improve circulation or to achieve other therapeutic benefits. The particular actuation pattern may be selected according to a particular desired therapeutic outcome or other medical protocol. Taking the circulation application as an example, it may be beneficial to provide a smooth on/off transition between adjacent actuators to create a rolling motion and to gently encourage fluid flow. In the case of more targeted therapies such as deep tissue massage, it may be beneficial to keep certain actuators in the on-state or to pulse certain actuators with high intensity. The control module may be used to select different modes, set a timer, or collect and log data. In some embodiments, a user interface module is operatively coupled with the control module and is configured to send and/or receive information to and/or from a user regarding the system's operation mode or other system status information.

The control module may also act as part of a feedback loop for the wearable actuator system. The hydraulic actuators within the active layer of the system are configured to provide a feedback signal to the control module. In some embodiments, the feedback signal is inherently created by the actuator and is detectable by the control module. For example, the feedback signal may be generated as a function of actuator capacitance. The control module calculates an amount of pressure applied to the object (e.g., user) based on the feedback signal. Thus, the actuators within the wearable actuator system may also function as pressure sensors without adding additional componentry or complexity to the system. These dual-functionality components are advantageous in that pressure information is collected without needing to integrate additional sensors and circuitry. Furthermore, because the pressure information is collected by the component applying the pressure directly, the data may be more accurate than if read from a sensor located away from the pressure application location.

In some embodiments, the self-sensing aspect of the wearable system may be used to ensure that specific pressures are applied to the user. For example, the control module may compare the actual applied pressure to a target applied pressure. The target applied pressure may be specified as a function of the system's operating mode or may be manually selected by a user. The control module may calculate an amount of difference between the target applied pressure and the actual applied pressure and may adjust an amount of voltage provided to the actuators to increase or decrease the actual applied pressure such that the target pressure is achieved.

Figure 11A:
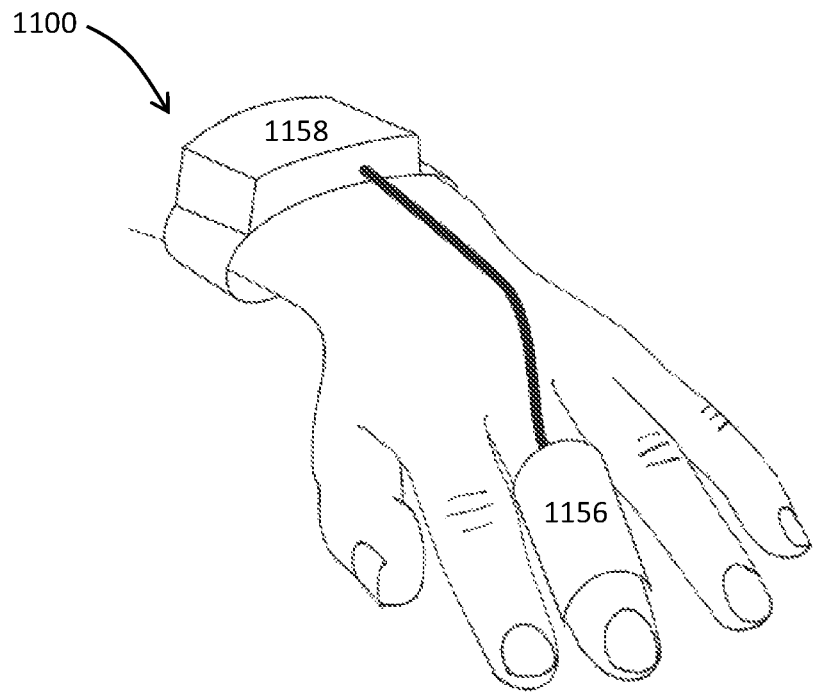
FIG. 11A shows a perspective view of a wearable actuator system as worn on a user's hand, in accordance with an embodiment.
Figure 11B:
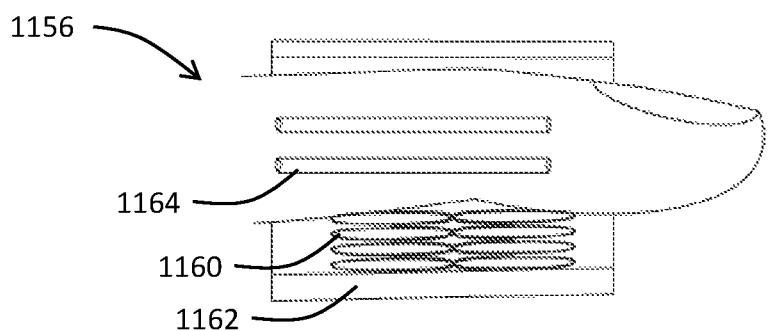
FIGS. 11B and 11C illustrate side views of a wearable actuator system in an off-state and in an on-state, respectively, in accordance with an embodiment.
Figure 11C:
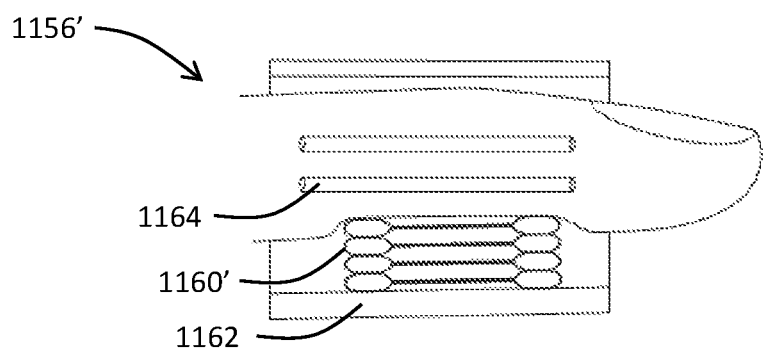

In other embodiments, the self-sensing aspect of the actuators described herein may be used to collect health information such as blood pressure and/or pulse. Referring to FIG. 11A, a wearable actuator system 1100 is shown on a user's hand. The system 1100 includes a monitor portion 1156 and a control portion 1158 that is electrically connected to the monitor portion. The control portion 1158 may include a control module and/or a power source (not shown). Cross-section views of the monitor portion 1156 in an off-state and in an on-state are illustrated in FIGS. 11B, 11C, respectively. The monitor portion 1156 may include a stack of expanding actuators 1160 (e.g., actuators similar to actuators 120 described with respect to FIGS. 7A-7C) and a cuff 1162 configured to securely hold the user's finger relative to the actuator stack. When actuated, actuators 1160' press against the user's finger. The amount of resistance detected by the capacitive self-sensing aspects of the actuators may be used to determine a blood pressure and a pulse rate of as blood flows through vasculature 1164 within the finger.

Similar systems may be used as a user input system. For example, in a system having a finger cuff with actuators therein as discussed above, the control portion of the system may detect capacitance of the actuators to determine if a user is pushing on the actuators. The system may be configured such that detecting capacitance associated with the user pushing on the actuators is associated with a system action. For example, the system may toggle between modes, or may relay the input information to another system to interpret and respond to. While a finger cuff is described as an example, many other types of systems may be configured using these principles in order to facilitate user input to a system.

Figure 12A:
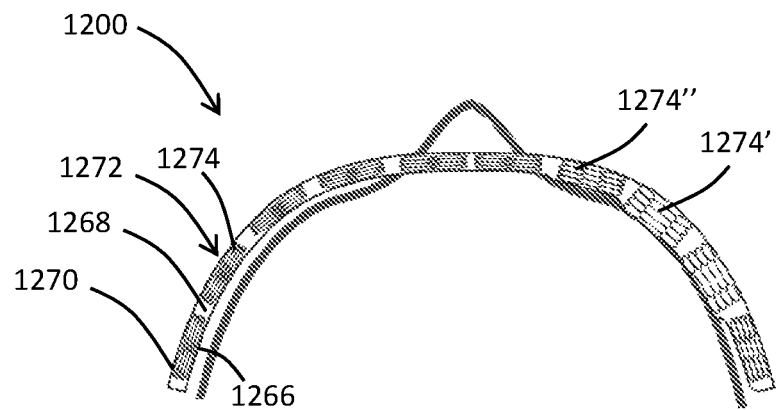
FIGS. 12A and 12B show a top-down view and a front view, respectively, of a wearable actuator system as worn on a user's head, in accordance with an embodiment.
Figure 12B:
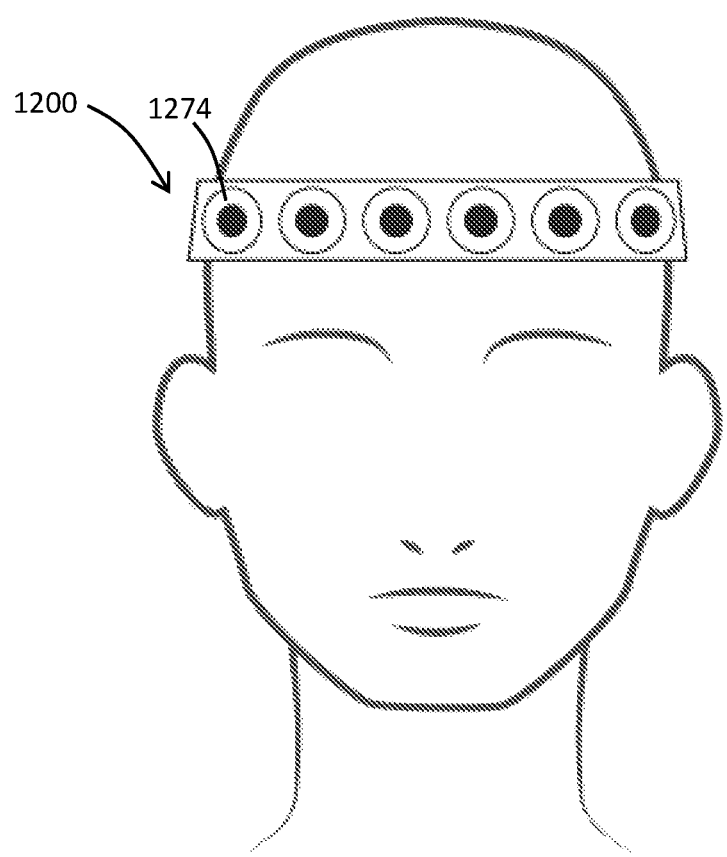

In addition to receiving input from the user, wearable actuator systems may be used to provide haptic feedback to a user. FIGS. 12A and 12B illustrate top-down and front views, respectively, of a wearable actuator system 1200 on a user's forehead configured to provide haptic feedback to the user. The system 1200 may include an interface layer 1266, an active layer 1268, and an outer layer 1270. The active layer 1268 may include a plurality of expanding actuator stacks 1272 having actuators 1274, 1274', 1274" (e.g., similar to actuators 120 described with respect to FIGS. 7A-7C). The actuators may be in an off-state (i.e., actuator 1274), in a max on-state (i.e., actuator 1274'), or in an on-state between off- and max on (i.e., actuator 1274"). In the example shown, system 1200 may be used to provide direction to a user. For example, if the user is playing a sports game where a ball is located to a right/front area of the user's field of view, system 1200 may actuate the stack of actuators at the right/front area of the user's forehead. The user may interpret the pressure from the expanded actuators as an indication to look toward the front/right direction.

Figure 13:
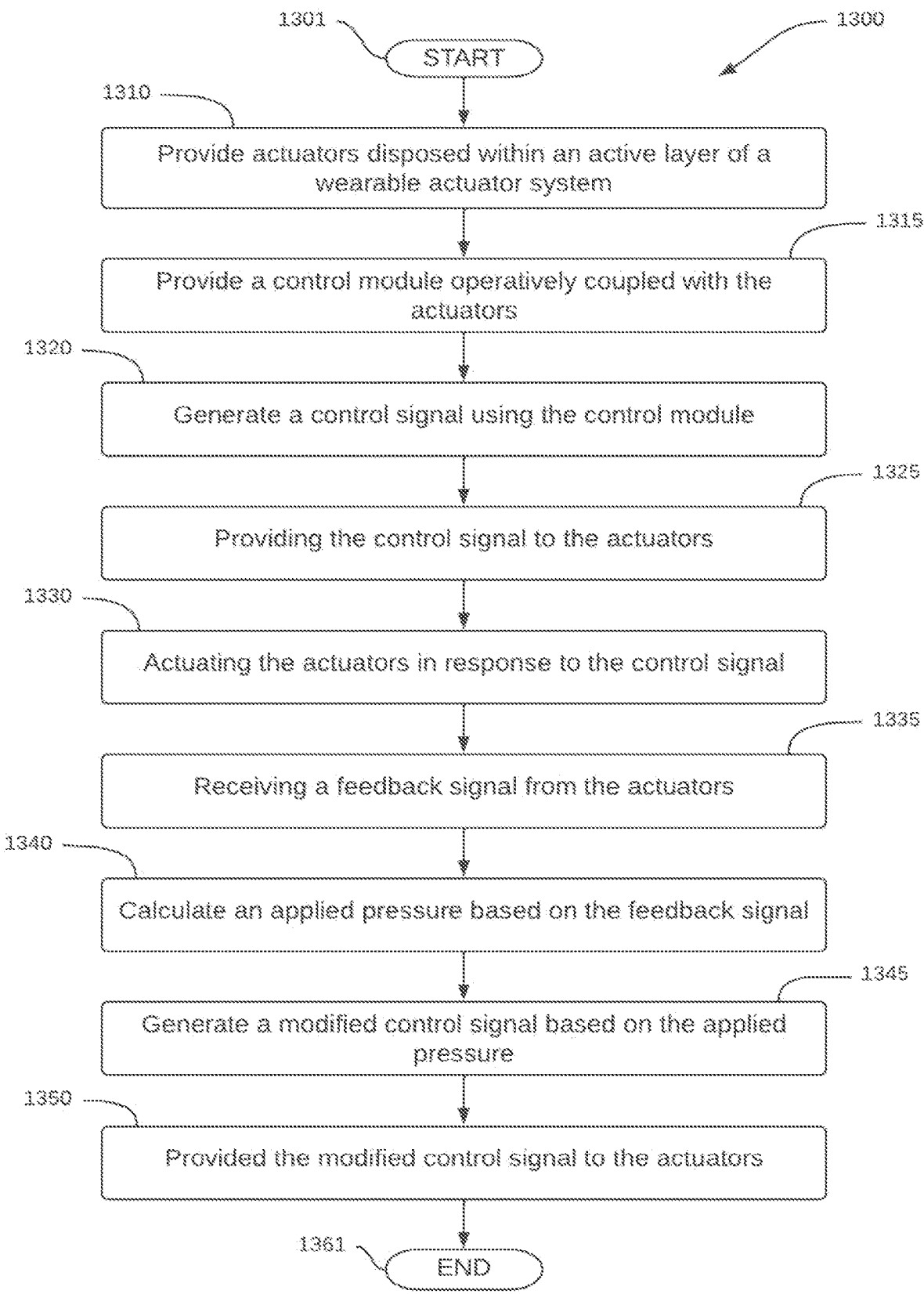
FIG. 13 shows a flow chart illustrating a method for operating a wearable actuator system, in accordance with an embodiment.

FIG. 13 shows a flow chart illustrating a method for operating a wearable actuator system, in accordance with an embodiment. The wearable actuator system includes, for example, one or more actuators (e.g., the soft hydraulic actuators described above) disposed within an active layer of the wearable actuator system, such as illustrated in the aforedescribed embodiments. The actuators may be controlled using control signals from a control module, and the control signal may be modified according to, for instance, applied pressure at the actuators.

As shown in FIG. 13, a process 1300 begins with a start step 1301, then proceeds to a step 1310 to provide actuators disposed within an active layer of a wearable actuator system. Process 1300 also includes a step 1315 to provide a control module operatively coupled with the actuators. The control module then generates a control signal in a step 1320, then provides the control signal to the actuators in a step 1325. The providing step may be implemented, for example, by providing an electrical signal via wired or wireless connection circuitry between the control module and the actuators.

Process 1300 then proceeds to a step to actuate the actuators in response to the control signal. In certain embodiments, the control signal may include high voltage electrical signals for activating the actuators. In some embodiments, the control signal may be provided to a separate high voltage circuit to generate the high voltage electrical signal delivered to the actuators. Then, a feedback signal may be received from the actuators in a step 1335. The feedback signal may include changes in the electrical properties of the actuators (e.g., capacitance, resistance, impedance, and other detectable properties) due to, for example, applied pressure at the actuators. For instance, the actuator, when actuated in step 1330, may expand to increase in height (see, for example, FIGS. 11B and 11C). The height increase may result in a change in one or more electrical properties of the actuators if an obstacle (such as a finger in FIGS. 11B and 11C) is encountered. This change in electrical property may be provided back toward the control module as the feedback signal.

In the illustrated embodiment, process 1300 proceeds to a step 1340 to calculate an applied pressure based on the feedback signal. The calculation may include, for instance, conversion of the feedback signal into a calculated pressure value based on a priori knowledge regarding the electrical properties of the actuators. The applied pressure so calculated is then used to generate a modified control signal based on the applied pressure. For instance, the control module may compare the actual applied pressure (e.g., to a finger in FIGS. 11B and 11C) to a target applied pressure for a specific use scenario. Then, the control module may generate and provide a modified control signal in steps 1345 and 1350, in accordance with the applied pressure so calculated above. Process 1300 terminates in an end step 1360.

Figure 14:
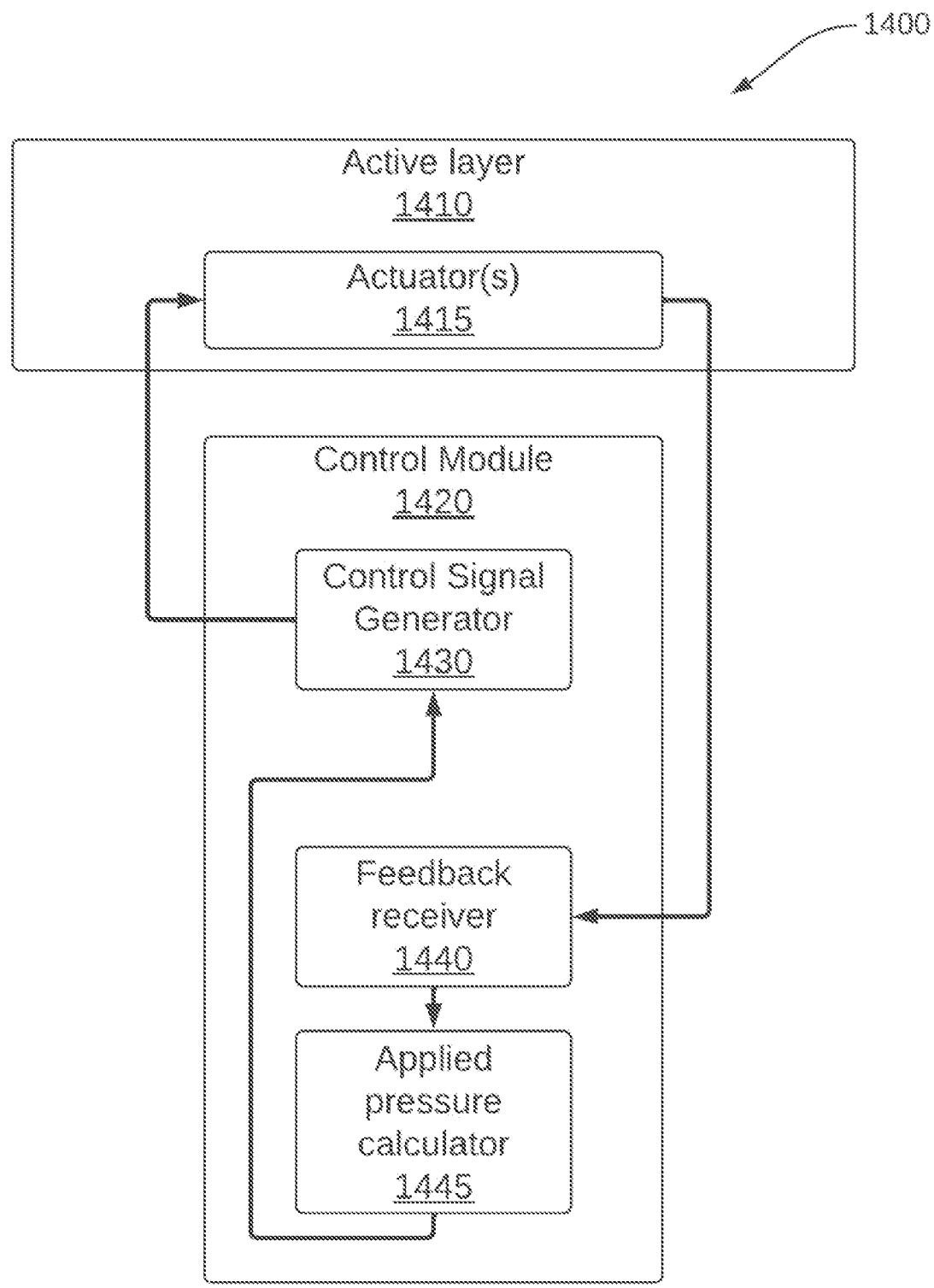
FIG. 14 shows a block diagram of a wearable actuator system suitable for implementing the method illustrated in FIG. 13.

FIG. 14 shows a block diagram of a wearable actuator system suitable for implementing the method illustrated in FIG. 13. As shown in FIG. 14, a wearable actuator system 1400 includes an active layer 1410 with actuators 1415 disposed therein. Examples of such a combination of actuators and active layer are illustrated and described above in the present disclosure.

Wearable actuator system 1400 also includes a control module 1420. Control module 1420 includes a control signal generator 1430, which is electrically connected with actuators 1415. Control module 1420 also includes a feedback receiver 1440, also electrically connected with actuators 1415 and configured for receiving feedback signals from actuators 1415. In the illustrated embodiment, control module 1420 further includes an applied pressure calculator 1445. The applied pressure value calculated at applied pressure calculator 1445 is provided to control signal generator 1430, which then modifies the control signal provided to actuators 1415, in accordance with the applied pressure value.

Many other applications of the haptic feedback systems are possible using these concepts. The systems may be placed on any part of the user's body and may be used to represent a variety of information depending on a particular use case. Thus, the example provided herein is provided to illustrate the concept and should not be considered as limiting. User input and/or haptic feedback systems may be further connected to computers, phones, tablets, or other types of devices with which a user may interact.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

The invention claimed is:

1. A wearable actuator system comprising:
    an active layer comprising a plurality of actuators, each actuator comprising:
        a deformable shell that defines an enclosed internal cavity,
        a fluid dielectric contained within the enclosed internal cavity,
        a first electrode disposed over a first side of the enclosed internal cavity,
        a second electrode disposed over a second side of the enclosed internal cavity;

an interface layer disposed on at least a first side of the active layer, wherein the interface layer is configured to contact a user;
a fastener, wherein the active layer and the fastener form an enclosed shape having an internal area; and
a control module operably coupled with the active layer and configured to provide a control signal to at least a portion of the plurality of actuators in the active layer,
wherein a size of the internal area of the enclosed shape is adjustable using the fastener,
wherein the plurality of actuators forming at least one actuator stack, and
wherein the at least one actuator stack includes an end cap disposed over each end of the actuator stack,
wherein the control module is configured to receive a feedback signal generated by at least one of the plurality of actuators and indicating a change in an electrical property of the at least one of the plurality of actuators, the electrical property including at least one of capacitance, resistance, and impedance,
wherein the control module is further configured to calculate an actual applied pressure based on the feedback signal so received from the at least one of the plurality of actuators and comparing the actual applied pressure to a target applied pressure; and
wherein the control module is further configured to modify the control signal in response to the feedback signal so received to adjust an amount of voltage provided to the at least one of the plurality of actuators such that the target applied pressure is achieved.

2. The system of claim 1, wherein the active layer is inelastic.

3. The system of claim 1, wherein the fastener comprises at least one of a strap, an elastic section, hook and loop, and a buckle.

4. The system of claim 1, wherein the control signal comprises a low-frequency signal and a high-frequency signal.

5. The system of claim 1, wherein the plurality of actuators comprises at least a first subset of the plurality of actuators and a second subset of the plurality of actuators.

6. The system of claim 5, wherein the first subset is disposed in an inner sub-layer within of the active layer and wherein the second subset is disposed in an outer sub-layer within the active layer.

7. The system of claim 1, wherein the interface layer is formed of a low-friction material.

8. The system of claim 5, wherein the control module is configured to provide a first control signal to the first subset and wherein the control module is configured to provide a second control signal to the second subset.

9. The system of claim 8, wherein the first signal is operable to actuate the first subset of the plurality of actuators at a first time and wherein the second signal is operable to actuate the second subset of the plurality of actuators at a second time different from the first time.

10. The system of claim 8, wherein the first signal and the second signal have different signal characteristics.

11. The system of claim 10, wherein the signal characteristics are selected from a group consisting of voltage, frequency, current, and duty cycle.

12. The system of claim 1, further comprising a power source electrically coupled with the control module and the active layer.

13. The system of claim 12, wherein the power source comprises a multi-channel power supply.

14. The system of claim 1, further comprising an outer layer disposed on a second side of the active layer opposite the first side.

15. The system of claim 14, wherein the outer layer comprises one of a flexible material and a rigid material.

16. A method of operating a wearable actuator system, the method comprising:
providing a plurality of actuators disposed within an active layer of the wearable actuator system,
wherein the plurality of actuators forming at least one actuator stack, and
wherein the at least one actuator stack includes an end cap disposed over each end of the actuator stack;
providing a control module operatively coupled with the plurality of actuators;
generating a control signal using the control module;
providing the control signal to at least one actuator of the plurality of actuators;
actuating the at least one actuator in response to the control signal, wherein actuating the at least one actuator comprises increasing a height of the at least one actuator;
receiving at the control module a feedback signal generated by the at least one actuator and indicating a change in an electrical property at the at least one actuator, the electrical property including at least one of capacitance, resistance, and impedance;
calculating an actual applied pressure based on the feedback signal so received from the at least one of the plurality of actuators;
comparing the actual applied pressure to a target applied pressure;
generating a modified control signal based on the feedback signal so received to adjust an amount of voltage provided to the at least one of the plurality of actuators; and
providing the modified control signal to the at least one of the plurality of actuators such that the target applied pressure is achieved at the at least one of the plurality of actuators.

17. The method of claim 16, wherein the feedback signal indicates a change in the electrical property due to applied pressure at the at least one actuator,
the method further comprising:
calculating an amount of the applied pressure based on the feedback signal so received, and
generating the modified control signal based additionally on the amount of applied pressure so calculated.

18. The method of claim 16, wherein the feedback signal indicates a change in the electrical property due to a change in height of the at least one of the plurality of actuators.

19. The system of claim 1, wherein the feedback signal indicates a change in the electrical property of the at least one of the plurality of actuators due to applied pressure thereto, and
wherein the control module is further configured to calculate an amount of the applied pressure based on the feedback signal.

20. The system of claim 1, wherein the feedback signal indicates a change in the electrical property of the at least one of the plurality of actuators due to a change in height of the at least one of the plurality of actuators.

* * * * *